US008812400B2

(12) United States Patent
Faraboschi et al.

(10) Patent No.: US 8,812,400 B2
(45) Date of Patent: Aug. 19, 2014

(54) MANAGING A MEMORY SEGMENT USING A MEMORY VIRTUAL APPLIANCE

(75) Inventors: Paolo Faraboschi, Barcelona (ES); Moray McLaren, Bristol (GB); Antonio Lain, Menlo Park, CA (US); Jose Renato G. Santos, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 649 days.

(21) Appl. No.: 12/833,438

(22) Filed: Jul. 9, 2010

(65) Prior Publication Data

US 2012/0011500 A1 Jan. 12, 2012

(51) Int. Cl.
*G06F 21/00* (2013.01)
*G06F 12/14* (2006.01)

(52) U.S. Cl.
CPC .................................. *G06F 12/1491* (2013.01)
USPC .......................................................... 705/50

(58) Field of Classification Search
USPC .............. 705/50, 16, 21, 59, 71; 380/44, 262, 380/278, 279
See application file for complete search history.

(56) References Cited

U.S. PATENT DOCUMENTS

| 6,263,421 | B1 * | 7/2001 | Anderson | 712/209 |
|---|---|---|---|---|
| 7,356,665 | B2 | 4/2008 | Rawson, III | |
| 7,412,705 | B2 | 8/2008 | Misra | |
| 7,478,204 | B2 | 1/2009 | McKenney et al. | |
| 7,817,038 | B2 * | 10/2010 | Torning | 340/572.1 |
| 2004/0168030 | A1 * | 8/2004 | Traversat et al. | 711/133 |
| 2005/0183088 | A1 * | 8/2005 | Muller et al. | 718/108 |
| 2005/0187786 | A1 * | 8/2005 | Tsai | 705/1 |
| 2006/0294519 | A1 | 12/2006 | Hattori et al. | |
| 2008/0134174 | A1 | 6/2008 | Sheu et al. | |
| 2009/0037496 | A1 | 2/2009 | Chong et al. | |
| 2009/0063806 | A1 | 3/2009 | Logan et al. | |
| 2009/0070776 | A1 | 3/2009 | Dahlstedt | |
| 2009/0178037 | A1 | 7/2009 | Winter et al. | |
| 2009/0204960 | A1 | 8/2009 | Ben-Yehuda et al. | |
| 2009/0210888 | A1 | 8/2009 | Lee et al. | |
| 2009/0222816 | A1 | 9/2009 | Mansell et al. | |
| 2010/0030742 | A1 * | 2/2010 | Surmont et al. | 707/3 |
| 2010/0083274 | A1 * | 4/2010 | Green et al. | 718/105 |
| 2010/0138831 | A1 * | 6/2010 | Inoue et al. | 718/1 |
| 2012/0246478 | A1 * | 9/2012 | Nakae et al. | 713/168 |

OTHER PUBLICATIONS

John Ousterhout et al., "The Case for RAMClouds: Scalable High-Performance Storage Entirely in DRAM", Dept. of CS, Stanford Univ., 14 pages, 2009.
Kevin Lim et al., "Disaggregated Memory for Expansion and Sharing in Blade Servers", 12 pages, ISCA'09, Jun. 20-24, 2009, Austin, Texas, USA.
Jay P. Hoeflinger, "White Paper: Extending OpenMP* to Clusters", Intel Corp., 10 pages, 2006.

\* cited by examiner

*Primary Examiner* — Dante Ravetti

(57) ABSTRACT

In a method for managing a memory segment through use of a memory virtual appliance, data is encapsulated with the memory virtual appliance, in which the memory virtual appliance comprises a virtual machine configured to manage a memory segment in a physical memory. In addition, the memory virtual appliance is implemented using a virtualization wrapper comprising computer readable code enabling the encapsulated data to be shared among a plurality of clients. Moreover, the encapsulated data is stored in the memory segment controlled by the memory virtual appliance.

11 Claims, 6 Drawing Sheets

MANAGING A MEMORY SEGMENT USING A MEMORY VIRTUAL APPLIANCE

BACKGROUND

Increasingly, modern data centers are designed with a heterogeneous mixture of computing nodes including "fat" computing nodes, "thin" computing nodes, and dedicated nodes to accelerate important functions. Fat computing nodes are nodes with multiple sockets of high-end symmetrical multiprocessors (SMPs) with large memory spaces, while thin computing nodes are relatively low-power and low-cost processors with reduced memory. The dedicated nodes are nodes that are limited in purpose and/or functionality and include nodes that are used for memory. These memory-purposed nodes are known to be designated as memory appliances.

Memory appliances are useful in several environments in the datacenter, such as acceleration of transaction processing, storing metadata for fast locking, in-memory databases for analytics and business intelligence (BI), storage caching or tier-0 storage. When used as memory expanders, memory appliances have also been shown to be effective as a remote paging device under hypervisor control. Additionally, when used to encapsulate high level abstractions (such as memcached) memory appliances are known to significantly accelerate dynamic web serving.

However, these approaches represent ad-hoc solutions that only address limited aspects at a time of memory usage in modern data centers. In other words, the conventional approaches to memory usage tend to be directed towards a single functionality and/or rely on some combination of special-purpose hardware and software. Additionally, these approaches also do not provide a uniform way of covering centralized and peer-to-peer approaches, whose combination is becoming increasingly common as the modern data center evolves and gradually introduces new functionalities.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an example embodiment thereof. In the following description, numerous specific details are set forth in order to provide a thorough understanding of the embodiments. It will be apparent however, to one of ordinary skill in the art, that the present invention may be practiced without limitation to these specific details. In other instances, well known methods and structures have not been described in detail so as not to unnecessarily obscure the present invention.

Disclosed herein are embodiments directed to a method and node for managing a memory segment through use of a memory virtual appliance. The memory virtual appliance comprises a virtual machine configured to manage a memory segment in a physical memory and is configured to encapsulate the data. The memory virtual appliance is implemented using a virtualization wrapper that comprises computer readable code that enables the encapsulated data to be shared among a plurality of clients. In one regard, the memory virtual appliance enables the encapsulated data to be disaggregated from a client, such as a computing device or a virtual machine operating on the computing device, to thus be accessed by multiple clients. In another regard, the memory virtual appliance is able to actively manage the memory segment containing the data independent of instructions from a client. As such, encapsulation of data with the memory virtual appliance as disclosed herein offers a relatively rich access interface to clients. For instance, because the memory virtual appliances disclosed herein are not tied to a particular device, the memory virtual appliances may be stored in devices having excess memory, to thereby substantially maximize usage of available memory capacities.

The memory virtual appliances additionally provide an abstraction that may be used to implement a variety of applications. In one example, the memory virtual appliances may be used to encapsulate data and to offer a rich access interface to clients that require additional memory. In addition, the memory virtual appliances may be relatively lightweight and may be employed under hypervisor control to transparently implement resilience and distributed replication functionalities without compromising performance. The memory virtual appliances discussed herein are hardware independent and may be used to interface to a wide variety of configurations of physical memory (including non-volatile memory) and to also expose excess dynamic random access memory (DRAM) capacity of computing nodes.

Figure 1:
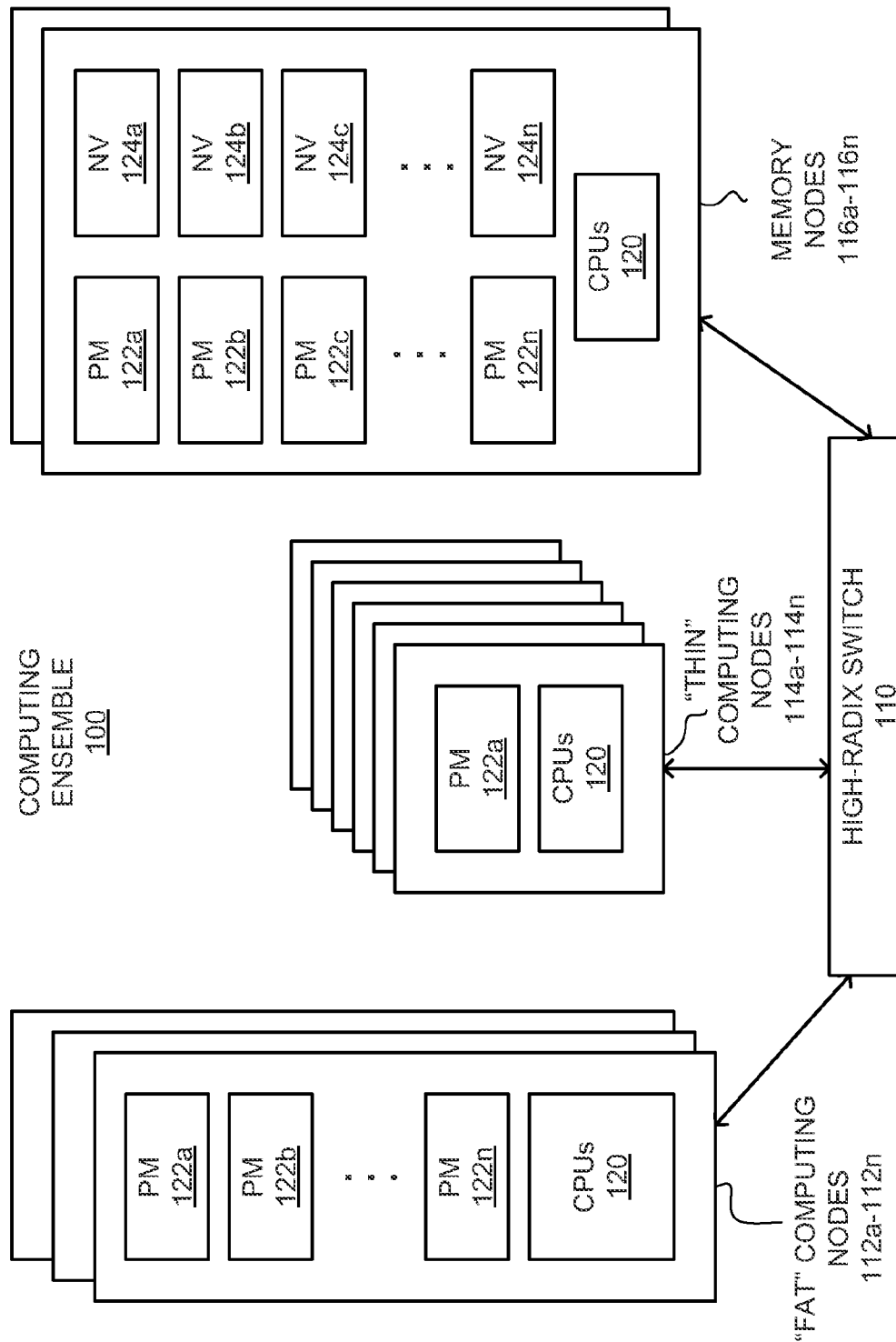
FIG. 1 depicts a block diagram of a computing ensemble comprised of a mixture of computing nodes, in which various embodiments of the invention may be implemented, according to an example embodiment of the invention.

With reference first to FIG. 1, there is shown a block diagram of a computing ensemble 100 comprised of a mixture of computing nodes, in which various embodiments of the invention may be implemented, according to an example embodiment. It should be understood that the computing ensemble 100 may include additional components and that one or more of the components described herein may be removed and/or modified without departing from a scope of the computing ensemble 100.

As shown in FIG. 1, the computing ensemble 100 includes a high-radix switch 110, a plurality of fat computing nodes 112a-112n, a plurality of thin computing nodes 114a-114n and a plurality of memory nodes 116a-116n. Although not shown, all of the nodes in the computing ensemble 100 may be connected through a fast and flat optical fabric.

In any regard, as shown in FIG. 1, the fat computing nodes 112a-112n comprise nodes with central processing units (CPUs) 120 and physical memories (PMs) 122a-122n. The CPUs 120 may comprise, for example, multiple sockets of high-end symmetrical multiprocessors (SMPs) and the PMs 122a-122n may comprise memories with relatively large memory capacities. The thin computing nodes 114a-114n are also depicted as including CPUs 120 and PMs 122a. The CPUs 120 of the thin computing nodes 114a-114n generally comprise relatively low power and low-cost processors and the PMs 122a comprise relatively low capacity memories. The memory nodes 116a-116n may comprise memory appliances having a plurality of PMs 122a-122n and non-volatile memory cells (NVs) 124a-124n, along with one or more CPUs 120 to control the memory appliances. Although not explicitly shown, the computing nodes 112a-112n and 114a-114n may also include NVs 124a-124n.

As discussed in greater detail herein below, specialized virtual machines, which are termed "memory virtual appliances" (MVAs) throughout the present disclosure, may operate on one or more of the nodes 112a-112n, 114a-114n, and 116a-116n to enable data to be stored on the node(s) 112a-112n, 114a-114n, and 116a-116n virtually. In addition, the MVAs are associated with, assigned to, or host respective memory segments in the PMs 122a-122n or NVs 124a-124n and make those memory segments visible to clients, such as, virtual machines, servers, client devices, etc., regardless of whether the clients are located in the same node, the same network, etc., as the MVAs. In this regard, the clients may interact with the MVAs to store and access data virtually as if the data were stored locally on the clients. In addition, because the MVAs operate with hypervisors that are typically employed with conventional virtual machines, the clients may access the virtually stored data through either or both the MVAs or the hypervisor, which may be necessary, for instance, when the MVAs are not running.

As such, instead of being tied directly to any one of the PMs 122a-122n or NVs 124a-124n, the data may be virtually stored on one or more of the PMs 122a-122n or NVs 124a-124n through implementation of the memory virtual appliances discussed herein. Because the data may be disassociated from the physical memory upon which the data is stored, the data may be manipulated in various manners that are unavailable to data that are tied to particular physical memories.

Figure 2:
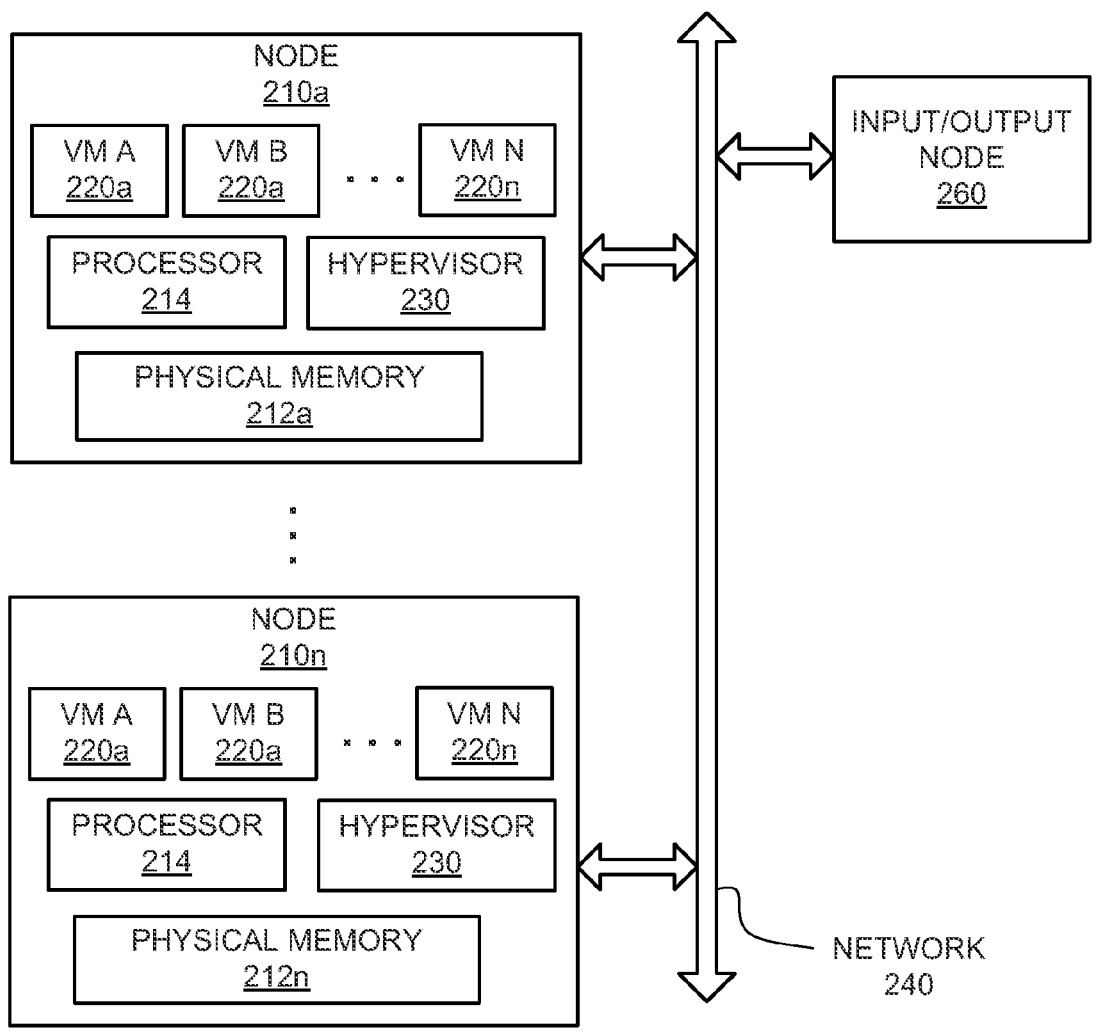
FIG. 2 depicts a simplified block diagram of a data processing infrastructure configured to be implemented in computing environment, according to an example embodiment of the invention.

Turning now to FIG. 2, there is shown a simplified block diagram of a data processing infrastructure 200 configured to be implemented in a computing environment, such as, the computing ensemble 100 depicted in FIG. 1, according to an example. It should be understood that the data processing infrastructure 200 may include additional components and that one or more of the components described herein may be removed and/or modified without departing from a scope of the data processing infrastructure 200.

Generally speaking, the data processing infrastructure 200 comprises a plurality of nodes 210a-210n, where n is a value greater than 1. The plurality of nodes 210a-210n may comprise a homogenous set or a heterogeneous mixture of computing nodes. Thus, for instance, the nodes 210a-210n may comprise the fat computing nodes 112a-112n, the thin computing nodes 114a-114n, and/or the memory nodes 116a-116n depicted in FIG. 1. In this regard, each of the nodes 210a-210n comprises a computing device, such as, a server or a memory node having a processor 214 for implementing and/or executing various instructions in each of the nodes 210a-210n.

In one particular implementation, one or more of the nodes 210a-210n comprise servers upon which one or more virtual machines (VM) 220a-220n are run. As is generally known to those of ordinary skill in the art, the VMs 220a-220n comprise software implementations of machines, such as, computers, that execute programs similar to a physical machine. In addition, the nodes 210a-210n include respective hypervisors 230, which may comprise a software layer or hardware that provides virtualization to the VMs 220a-220n. The hypervisors 230, or virtual machine monitors, generally operate to provide the VMs 220a-220n with a virtualization platform upon which the VMs 220a-220n operate and to monitor the execution of the VMs 220a-220n. Examples of suitable virtualization platforms include those available from XEN, VirtualBox, and VMware.

According to an embodiment, one or more of the VMs 220a-220n in one or more of the nodes 210a-210n comprise specialized VMs configured to be implemented as memory virtual appliances (MVAs) configured to host or control respective memory segments in the physical memories 212a-212n of the one or more nodes 210a-210n. The physical memories 212a-212n may comprise any of a variety of storage devices, such as, solid-state disks, disk caches, flash memories, etc. In addition, the physical memories 212a-212n may be volatile or non-volatile, replaceable or irreplaceable, storage devices. Moreover, the physical memories 212a-212n may be homogeneous with respect to each other or two or more of the physical memories 212a-212n may be heterogeneous with respect to each other.

The remaining VMs 220a-220n in this embodiment may comprise system VMs or other types of process virtual machines. The MVA(s) 220a-220n are generally implemented using a light-weight operating system and comprise computer readable code that hosts or controls respective memory segments in the physical memories 212a-212n. The operating system is considered to be "light-weight" because its sole function may be to manage the data stored in the memory segments under the control the MVAs 220a-220n. In any regard, the virtualization wrapper generally enables data stored in the memory segment controlled by the memory virtual appliance 220a-220n to be shared among a plurality of clients, which may comprise other nodes 210a-210n, input/output node(s) 260, or nodes located outside of the data processing infrastructure 200. The input/output nodes 260 may comprise computing devices, such as, servers, user terminals, etc., configured to communicate data with the nodes 210a-210n over a network 240. The network 240 may comprise a local area network, a wide area network, the Internet, etc.

Figure 3A:
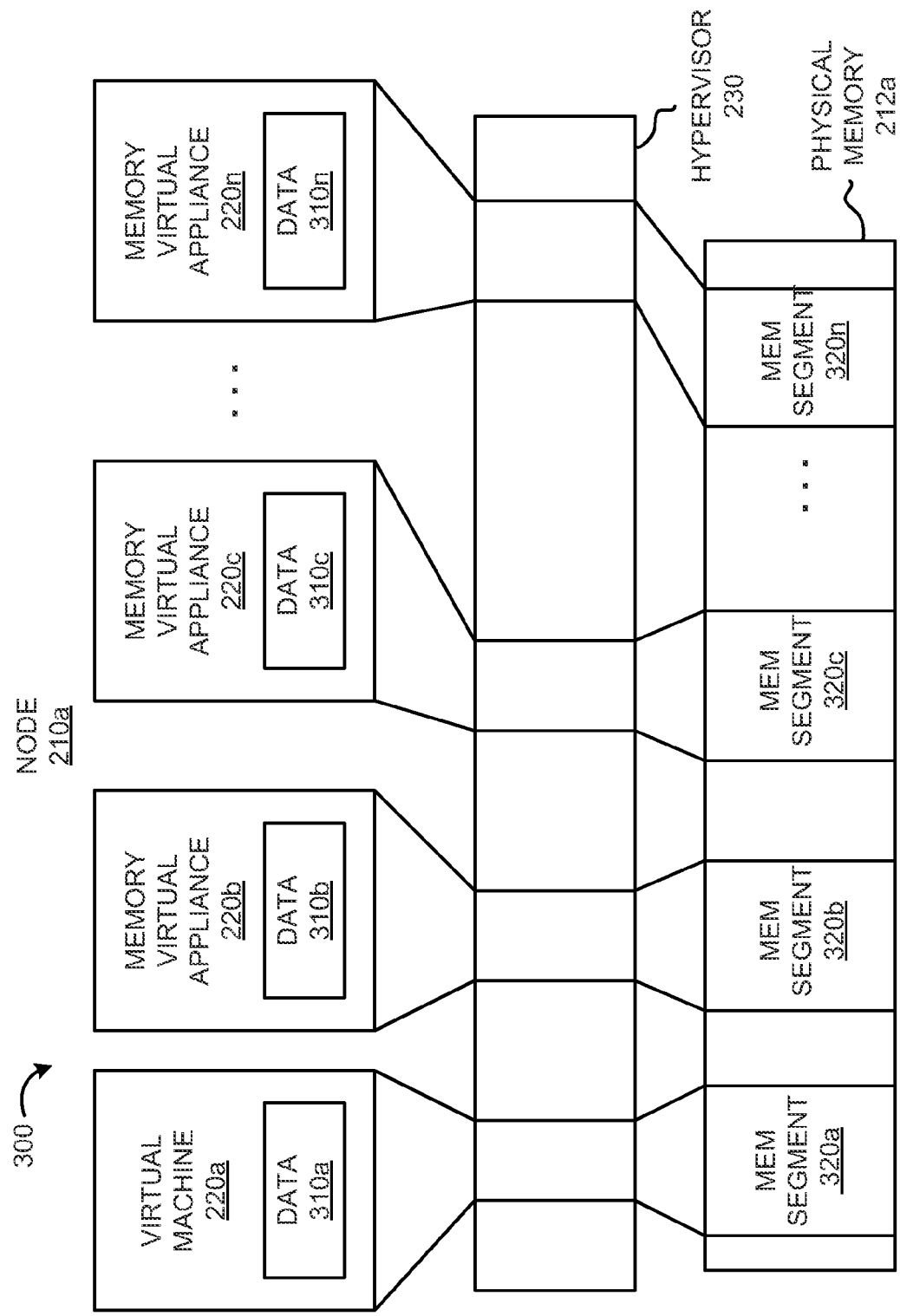
FIG. 3A depicts a schematic diagram of a portion of a node depicted in FIG. 2, according to an example embodiment of the invention.

Turning now to FIG. 3A, there is shown a schematic diagram 300 of a portion of a node 210a depicted in FIG. 2, according to an example. More particularly, FIG. 3A depicts an example of various manners in which VMs 220a-220n manage respectively controlled or hosted memory (MEM) segments 320a-320n of a physical memory 212a. It should be understood that the node 210a may include additional components and that one or more of the components described herein may be removed and/or modified without departing from a scope of the node 210a. For instance, although the node 210a has been depicted as having a single physical memory 212a, the node 210a may include additional physical memories 212a. In this regard, one or more of the memory segments 320b-320n may be located one or more physical memories of the node 210a.

The VMs 220a-220n, the hypervisor 230, and the physical memory 212a of the node 210a have been depicted in FIG. 3A. The first VM 220a has also been depicted as a conventional type of virtual machine, which is, for instance, configured to perform various functions other than MVA functions. In this regard, the first VM 220a may comprise a conventional system VM or a process VM other than a MVA. In addition, the remaining VMs 220b-220n have been depicted as comprising MVAs 220b-220n. Each of the VMs 220a-220n has been depicted as having control over or hosting a particular memory segment 320a-320n of the physical memory 212a. Although particular reference is made throughout to the physical memory 212a being composed of a plurality of memory segments 320a-320n, the memory segments 320a-320n may equivalently be termed as bits, memory blocks, or other equivalent elements for defining discrete locations in the physical memories 212a-212n in which data is at least one of stored, read, erased, rewritten, etc. In addition, each of the memory segments 320a-320n is formed of a plurality of memory cells or blocks upon which data may be stored and read from.

As also shown in FIG. 3A, each of the VMs 220a-220n is configured to cause respective data 310a-310n to be accessed in the respective memory segments 320a-320n. Each of the data 310a-310n may comprise a standalone set of information, such as, independently executable applications, photo files, audio files, video files, etc. In addition, two or more of the data 310a-310n may be interoperable.

During operation, the MVAs 220b-220n are configured to actively manage the respective memory segments 320a-320n. In one regard, the MVAs 220b-220n actively manage the memory segments 320a-320n independent of the clients that requested storage or other manipulation of the data 310b-310n and the physical memories 212a-212n on which the data 310a-310n are stored. More particularly, for instance, the MVAs 220b-220n comprise computer readable code that enables the MVAs 220b-220n to control how the memory segments 320a-320n are to be managed. By way of example, the MVAs 220b-220n may define one or more policies with respect to access, duplication, erasure, etc., of the data 310b-310n stored on the memory segments 320a-320n and may be able to cause any of those policies to be implemented without requiring receipt of additional instructions from a client. Thus, for instance, the MVAs 220b-220n may control one or more of: which clients, such as, nodes or VMs operating on the nodes are able to access the data 310b-310n stored in their respective memory segments 320b-320n, when the data 310b-310n is to be duplicated in another memory segment, whether and the number of times the data 310a-310n may be duplicated, whether and when the data 310b-310n are to be migrated, etc.

In addition, or alternatively, the MVAs 220b-220n also enable bookkeeping and access functions to be performed with respect to the data 310b-310n. The bookkeeping functions may include tracking which memory segments 320a-320n are hosted or controlled by which of the MVAs 220b-220n, as well as other life cycle management information of the MVAs 220b-220n. The access functions are generally configured to enable sharing of the data 310b-310n among multiple clients, security authorization requirements to access the data 310b-310n, etc. Furthermore, the MVAs 220b-220n may ensure atomicity of the copy operation so that no concurrent updates are allowed to occur. Moreover, the MVAs 220b-220n may support different client services, such as fast paging, Tier-0 storage, or remote direct memory access (RDMA)-based object replication.

Unless the VM 220a accesses the data 310b-310n under the control of the MVAs 220b-220n, the VM 220a is configured access the data to which it has rights to access, such as the data 310a stored in the memory segment 320a. The memory segment 320a may comprise, for instance, the available memory segments other than those under the control of the MVAs 220b-220n. The memory segment 320a to which the VM 220a stored data 310a differs from the other memory segments 320b-320n because the memory segment 320a does not store the data virtually. In other words, the data 310a stored in the memory segment 320a is not controlled by an MVA and thus, may not be actively managed. In this regard, the memory segment 320a is tied directly to the physical memory 212a.

Figure 3B:
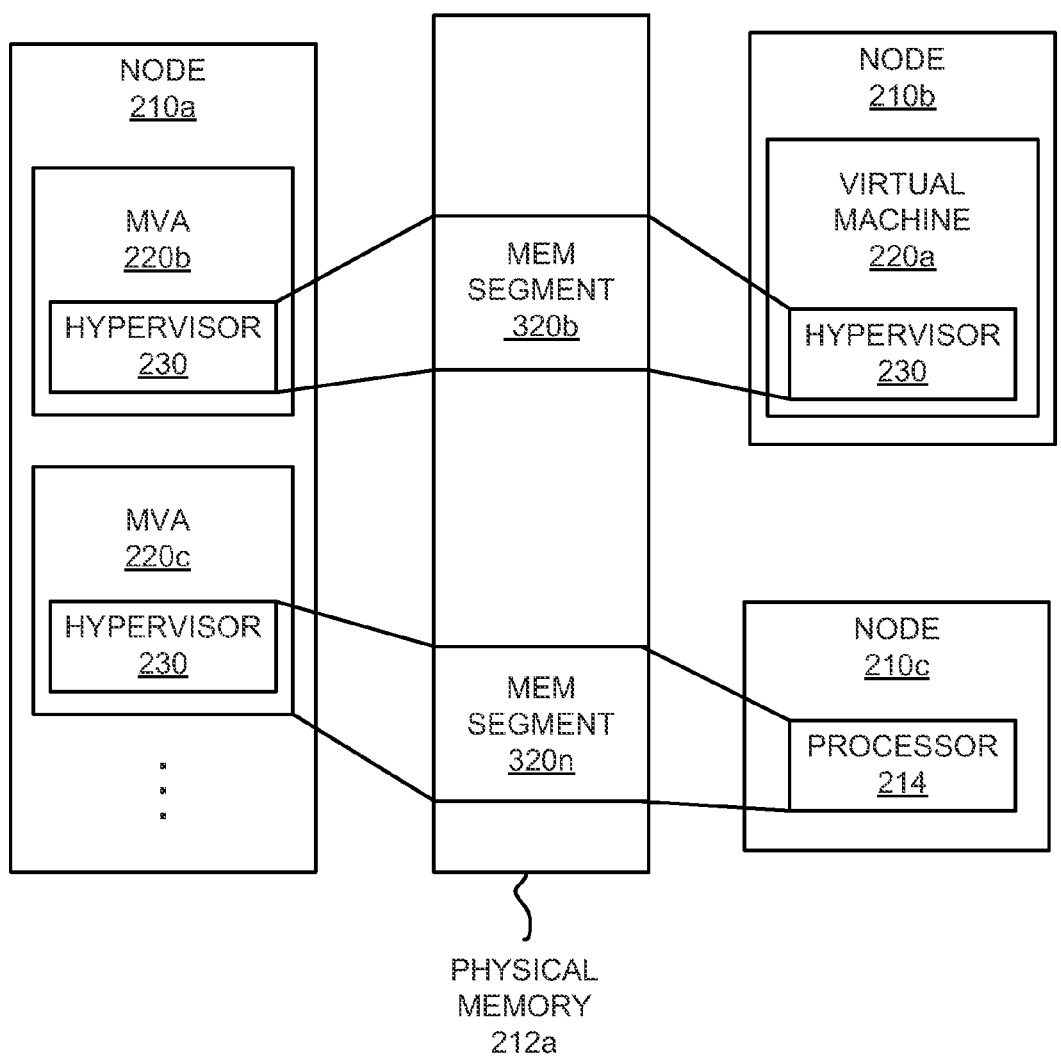
FIG. 3B depicts a schematic diagram of a portion of a plurality of nodes including the node depicted in FIG. 3A, according to an example embodiment of the invention.

Turning now to FIG. 3B, there is shown a schematic diagram 350 of a plurality of nodes including the node 210a depicted in FIG. 3A, according to an example. As shown in FIG. 3B, a first MVA 220b of the first node 210a has control over a first memory segment 320b and a second MVA 220c of the first node 210a has control over a second memory segment 320c. The physical memory 212a containing the memory segments 320b and 320c may be physically located on the first node 210a or on another node. Generally speaking, FIG. 3B is intended to show that the memory segments 320a-320n may be accessed by other nodes 210b-210c.

As shown in FIG. 3B, a second node 210b includes a VM 220a that is configured to access the memory segment 320b. In addition, a third node 210c does not include a VM, but instead, comprises, for instance, a conventional computing device configured to access the memory segment 320c. In the example depicted in FIG. 3B, the MVA 220b of the first node 210a controls access to the data stored in the memory segment 320b and may thus prevent access to that data to the processor 214 of the third node 210c, while allowing access to the VM 220a running on the second node 210b.

Figure 4:
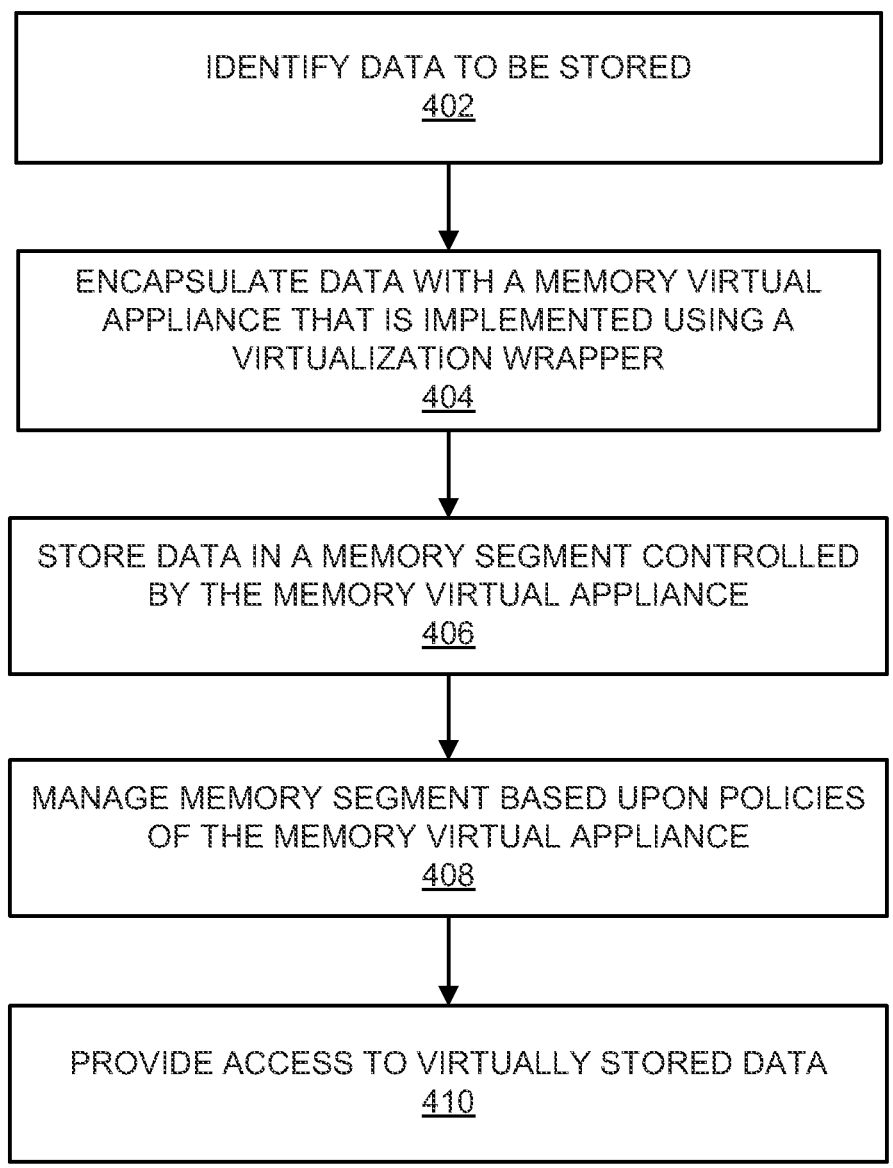
FIG. 4 shows a flow diagram of a method for managing a memory segment by using a memory virtual appliance, according to an example embodiment of the invention.

Various manners in which the MVAs 220b-220n may function are discussed in greater detail herein below with respect to FIG. 4. FIG. 4, more particularly, shows a flow diagram of a method 400 for managing a memory segment by using a memory virtual appliance, according to an example. It should be understood that the method 400 may include additional steps and that one or more of the steps described herein may be removed and/or modified without departing from a scope of the method 400.

The description of the method 400 is made with reference to the computing ensemble 100 and the data processing infrastructure 200 depicted in FIG. 2, respectively, and thus makes particular reference to the elements contained in those figures. It should, however, be understood that the method 400 may be implemented in an infrastructure that differs from the computing ensemble 100 and the data processing infrastructure 200 depicted in FIGS. 1 and 2 without departing from a scope of the method 400.

As shown in FIG. 4, at step 402, data 310b to be stored on a physical memory 212a of a node 210a is identified. For instance, the MVA 220b may receive a request from a client, such as, a VM 220a, another node 210b, an input/output node 260, etc., for the data 310b to be stored on the physical memory 212a. According to an example, the request to store the data 310b on the physical memory 212a may comprise a broadcast request by the client for the data 310b to be stored. In another example, the request to store the data 310b may be responsive to an indication by the MVA 220b that the MVA 220b has available storage capacity for the data 310b. In this example, the MVA 220b, once initiated, may broadcast an indication to the nodes 210a-210n in the infrastructure 200 that it is ready to receive data. Alternatively, the MVA 220b may register itself with a management network to inform the nodes 210a-210n that it is able to store data. It should be understood that the MVA 220b may receive the data to be stored in any other suitable manner. In any regard, for instance, the memory segments 320b-320n hosted by the MVAs 220b-220n are made visible to the clients and the clients are thus able to store the data 310b-310n in the hosted memory segments 320b-320n.

In any regard, at step 404, the data 310b is encapsulated with a MVA 320b that is implemented using a virtualization wrapper. As discussed above, the MVA 220b comprises computer readable code that enables the data 310*b* to be stored virtually and to be shared among a plurality of clients. In addition, prior to or during the encapsulation process, the MVA 320*b* may be programmed with one or more policies to actively manage the data and/or hosted memory segment 320*b* in one or more manners. For instance, the MVA 220*b* may control credential requirements of clients for access to the data, migration schedules, duplication schedules, etc. The active management may be based upon the data 310*b* itself, the physical memory 212*a* on which the data 310*b* is stored, a combination of the data 310*b* and the physical memory, etc. In any regard, the MVA 220*b* may encapsulate the data 310*b*, such as, by adding or modifying metadata of the data 310*b*. In addition, or alternatively, the MVA 220*b* may perform various other operations to ensure that client access to the memory segment 320*b* containing the data 310*b* is mediated, for instance, by the MVA 220*b* or by the local hypervisor 230, such that, for instance, migration, access control, memory addressing changes, etc., are transparent to the client.

At step 406, the data 310*b* is stored in a memory segment 320*b* that is hosted by the MVA 220*b* that encapsulates the data 310*b*. In this regard, the client that instructed the MVA 220*b* to store the data 310*b* and other clients that are authorized to access the data 310*b* have access to memory segment 320*b* upon which the data 310*b* is stored through the MVA 220*b*. In addition, the client(s) may access the stored data 310*b* through the hypervisor 230. In this regard, for example, the MVA 220*b* may communicate with the hypervisor 230 using an interface that indicates that the data 310*b* is stored in the memory segment 320*b* and is available to specific clients. Then the hypervisor 230 may employ mechanisms to facilitate remote and local clients access to the data 310*b*.

In one regard, because the MVAs 220*b*-220*n* enable the data 310*b*-310*n* to be stored virtually on respective memory segments 320*b*-320*n*, and because the MVAs 220*b*-220*n* are not necessarily tied to any particular node 210*a*-210*n* physical memory 212*a*-212*n*, the MVAs 220*b*-220*n* may be moved within and among different ones of the nodes 210*a*-210*n*. In addition, the clients may access the data 310*b* even in instances where the MVA 220*b* hosting the memory segment 320*b* is not operational through interaction with the hypervisor 230 of the node 210*b* containing the physical memory 212*a* upon which the data 310*a* is stored.

At step 408, following storage of the data 310*b*, the MVA 220*b* may manage the memory segment 320*b* based upon one or more policies of the MVA 220*b*. More particularly, for instance, the MVA 220*b* may be programmed with code that causes the MVA 220*b* to store the data 320*b* in a persistent memory location, migrated, duplicated, etc. In this regard, the MVA 220*b* may manage the memory segment 320*b* independently from and without receiving any instructions from a client. In addition, the hypervisor 250 is configured to track the manipulations to thus enable the data 310*b* to be later located and accessed.

In one particular example, the MVA 220*b* initially stores the data 310*b* in a volatile memory location, such as, RAM, and the MVA 220*b* may include code that causes the MVA 220*b* to migrate the data 310*b* to a different memory location that is persistent. In another example, the MVA 220*b* may automatically and transparently migrate to another node 210*b*, for instance, in response to the node 210*a* undergoing a failure or scheduled maintenance. In this example, the MVA 220*b* may migrate in manners similar to conventional VMs and may cause the data 310*b* stored on the memory segment 320*b* to also be migrated to a memory segment in the another node 210*b*. In one regard, therefore, clients may continue to access the data 310*b* regardless of which node 210*a*-220*n* in which the data 310*b* is stored because the clients access the data 310*b* through the MVAs 220*b*-220*n*. In addition, clients may continue to access the data 310*b* in instances where the MVAs 220*a*-220*n* are not operating by accessing the data 310*b* through the hypervisor 230.

At step 410, following storage, and optionally, manipulation, of the data 310*b*, access to the virtually stored data 310*b* is provided, for instance, through the MVA 220*b* and/or the hypervisor 230 as discussed above. The data 310*b* may be accessed, for instance, when a client seeks to read and/or manipulate, such as, duplicate, move, erase, re-write, etc., the data 310*b*.

According to an embodiment, a control domain may be configured to access page tables of all of the clients and, assuming that the control domain is pinned to a single core, the control domain may perform a remote direct memory access (RDMA) request on behalf of a "dormant" virtual machine without a latency hit. In that instance, the MVAs 220*b*-220*n* may export their visible segments/policies to the control domain thereby ensuring that the MVAs 220*b*-220*n* do not receive partial updates (by controlling a scheduler or changing page protection). The MVAs 220*b*-220*n* may thereby read their own memory segment 320*b*-320*n* contents without being concerned about partial updates of on-going updates from the network 260 and may, for instance, implement their own backup or versioning to the NVs 124*a*-124*n*.

Some of the operations set forth in the method 400 may be contained as one or more utilities, programs, or subprograms, in any desired computer accessible or readable medium. In addition, the method 400 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, phase change RAM (PCRAM), Memristor, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 5:
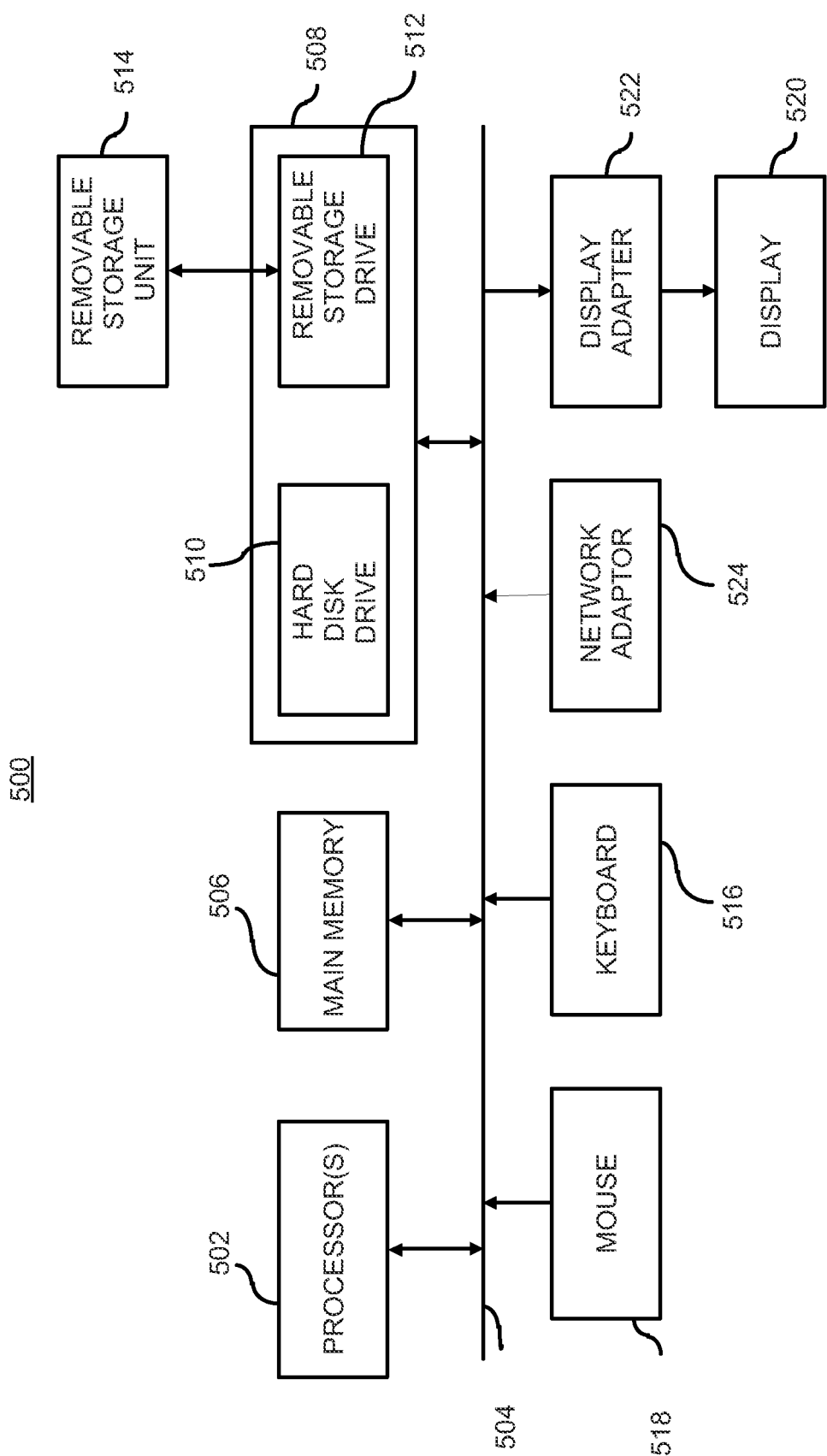
FIG. 5 illustrates a computer system, which may be employed to perform various functions of the nodes depicted in FIGS. 2, 3A and 3B in performing some or all of the steps contained in the flow diagram depicted in FIG. 4, according to an example embodiment of the invention.

FIG. 5 illustrates a computer system 500, which may be employed to perform the various functions of the nodes 210*a*-210*n* depicted in FIGS. 2, 3A, and 3B in performing some or all of the steps contained in the flow diagram depicted in FIG. 4, according to an example. In this respect, the computer system 500 may be used as a platform for executing one or more of the functions described hereinabove with respect to the method 400. More particularly, for instance, the computer system 500 may be used as a platform for executing one or more of the MVAs 220*b*-220*n* discussed above.

The computer system 500 includes a processor 502, which may be used to execute some or all of the steps described in the methods herein. Commands and data from the processor 502 are communicated over a communication bus 504. The computer system 500 also includes a main memory 506, such as a random access memory (RAM), where the program code may be executed during runtime, and a secondary storage 510. The secondary storage may comprise, for example, a hard drive or other non volatile memory, where a copy of the program code for the virtual machines 220a-220n, including the MVAs 220b-220n may be stored.

The computer system 500 may comprise a server having a web interface. In addition, or alternately, the computing system 500 may be configured with user input and output devices including a keyboard 516, a mouse 518, and a display 520. A display adaptor 522 may interface with the communication bus 504 and the display 520 and may receive display data from the processor 502 and convert the display data into display commands for the display 520. In addition, the processor 502 may communicate over a network, for instance, the Internet, LAN, etc., through a network adaptor 524.

It will be apparent to one of ordinary skill in the art that other known electronic components may be added or substituted in the computer system 500. In addition, the computer system 500 may include a system board or blade used in a rack in a data center, a conventional "white box" server or computing device, etc. Also, one or more of the components in FIG. 5 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for managing a memory segment of a physical memory through use of a memory virtual appliance, the method comprising:
   receiving, by the processor executing the memory virtual appliance, data from a client;
   disassociating, by the processor executing the memory virtual appliance, the data from the physical memory by:
   encapsulating the received data; and
   storing the encapsulated data in the memory segment of a physical memory controlled by the memory virtual appliance;
   notifying, by the processor executing the memory virtual appliance, a hypervisor of the storage of the encapsulated data in the memory segment to facilitate operations of the memory virtual appliance; and
   managing, by the processor executing the memory virtual appliance, the memory segment, wherein managing the memory segment includes
   migrating, by the processor executing the memory virtual appliance, the stored encapsulated data to another memory segment in another physical memory by:
   associating the memory virtual appliance with the other memory segment in the other physical memory; and
   moving the encapsulated data stored in the memory segment to the other memory segment.

2. The method according to claim 1, further comprising:
   providing client access to the encapsulated data stored in the memory segment through either the memory virtual appliance or directly through the hypervisor, independent of the memory virtual appliance.

3. The method according to claim 1, further comprising:
   receiving a request to access the encapsulated data from another client;
   determining that the other client is authorized to access the encapsulated data; and
   based on the determining that the other client is authorized to access the encapsulated data, providing access to the encapsulated data to the other client through the memory virtual appliance.

4. The method according to claim 3, wherein determining that the other client is authorized to access the encapsulated data further comprises determining, in the memory virtual appliance, that the other client contains appropriate credentials to access the encapsulated data.

5. The method according claim 1, further comprising:
   managing the memory segment controlled by the memory virtual appliance according to one or more policies of the memory virtual appliance.

6. The method according to claim 5, wherein managing the memory segment controlled by the memory virtual appliance further comprises actively managing the memory segment independent of instructions from a client authorized to access the encapsulated data stored on the memory segment.

7. The method according to claim 1, wherein migrating the encapsulated data includes migrating the memory virtual appliance to another location in a manner that is transparent to the client.

8. The method according to claim 5, wherein managing the memory segment controlled by the memory virtual appliance further comprises automatically duplicating the encapsulated data stored in the memory segment to another memory segment in another physical memory.

9. The method according to claim 1, further comprising:
   exporting identification of the memory segment controlled by the memory virtual appliance to a control domain;
   accessing, by the control domain, pages tables of a plurality of clients; and
   performing a remote direct memory access request on behalf of one of the plurality of clients.

10. The method according to claim 1, wherein managing the memory segment is the only managing performed by the memory virtual appliance.

11. A non-transitory computer readable storage medium on which is embedded instructions to manage a memory segment of a physical memory through use of a memory virtual appliance, wherein the instructions, when executed by a processor, cause the processor to perform the steps of:
   receiving data from a client;
   disassociating the received data from the physical memory, wherein to disassociate the received data from the physical memory, the processor is to:
   encapsulating the received data; and
   storing the encapsulated data in the memory segment of a physical memory controlled by the memory virtual appliance;
   notifying a hypervisor of the storage of the encapsulated data in the memory segment to facilitate operation of the memory virtual appliance; and
   managing the memory segment, wherein to manage the memory segment, the processor is to migrate the encapsulated data stored in the memory segment to another memory segment, wherein to migrate the encapsulated data, the processor is to perform the steps of:
   associating the memory virtual appliance with the other memory segment in the other physical memory; and
   moving the encapsulated data stored in the memory segment to the other memory segment.

* * * * *